US006557993B2

(12) United States Patent
Rossin

(10) Patent No.: US 6,557,993 B2
(45) Date of Patent: May 6, 2003

(54) EYEGLASSES AND PARTS THEREOF MADE WITH SPECIALLY PROCESSED NITI SHAPE MEMORY ALLOY

(75) Inventor: Paolo Rossin, Legnano-Milan (IT)

(73) Assignee: Optigen S.r.l., Milan (IT)

( * ) Notice: Subject to any disclaimer, the term of this patent is extended or adjusted under 35 U.S.C. 154(b) by 0 days.

(21) Appl. No.: 09/776,344

(22) Filed: Feb. 2, 2001

(65) Prior Publication Data

US 2001/0028431 A1 Oct. 11, 2001

Related U.S. Application Data

(63) Continuation-in-part of application No. 09/743,345, filed as application No. PCT/IT99/00038 on Feb. 19, 1999.

(30) Foreign Application Priority Data

Jul. 20, 1998 (IT) .......................................... MI98A1665

(51) Int. Cl.$^7$ ................................................. G02C 1/00
(52) U.S. Cl. ..................................................... 351/41
(58) Field of Search ........................... 351/41, 65, 111, 351/124, 126, 114, 158

(56) References Cited

FOREIGN PATENT DOCUMENTS

EP          648856 A1  *  4/1995

* cited by examiner

*Primary Examiner*—Hung Xuan Dang
(74) *Attorney, Agent, or Firm*—Hedman & Costigan, P.C.

(57) ABSTRACT

Spectacle frames having one or more components such as a bridge, nose rests and ear pieces of martensitic NiTi, NiTi nobium, NiTi iron alloy made by means of plastic deformation starting from a 20% work hardening raised by hammering up to 50% so that the final section of the material so treated maintains, within a range of temperatures from −50° C. to +70° C., sufficient elasticity and flexibility for adapting the frames to the different facial forms of users.

10 Claims, 7 Drawing Sheets

Shape Memory Effect

Figure 1:
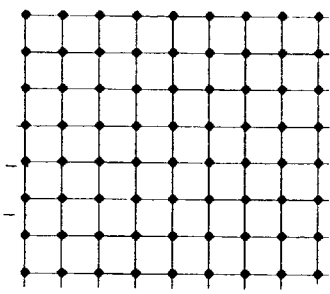
Figure 1:
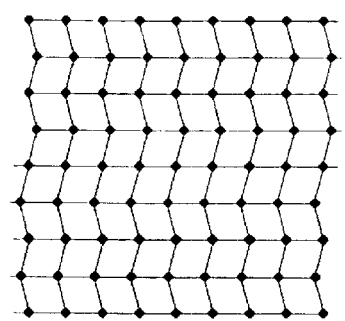
Figure 1:
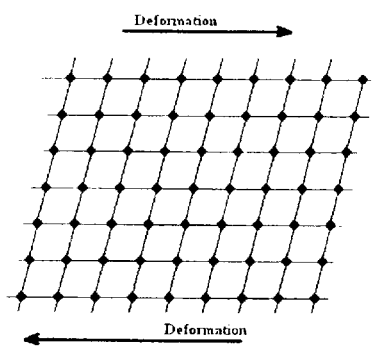
Figure 1:
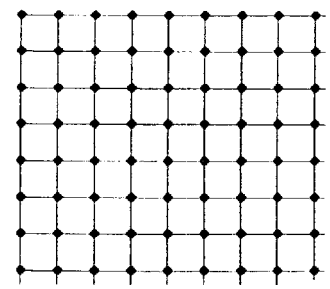

Figure 1(a) Bidimensional sketch of the ordered structure of austenite

Figure 1(b) Twins formation during TMT on cooling.

Figure 1(c) Easy accommodation of external deformation by twin movement.

Figure 1(d) Recovery of the initial shape upon heating to the austenite

Stress strain curve of an heavily cold drawn NiTi wire

Stress strain curve of a NiTi wire processed according to present invention

Direct comparison of previous curves.

Figure 4:
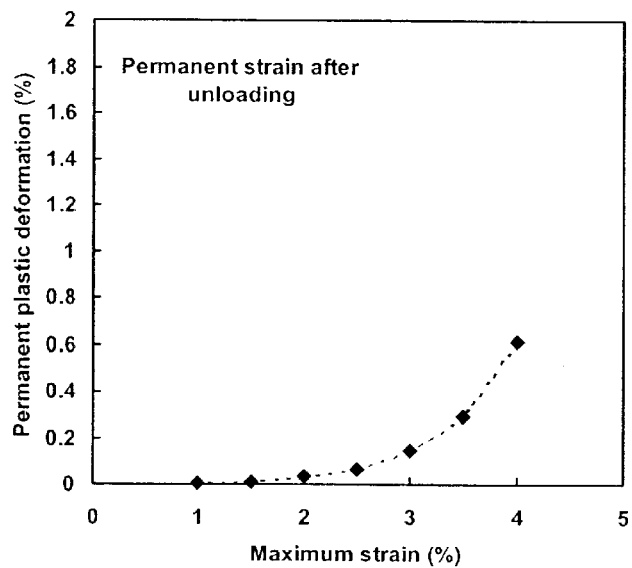
Figure 4:
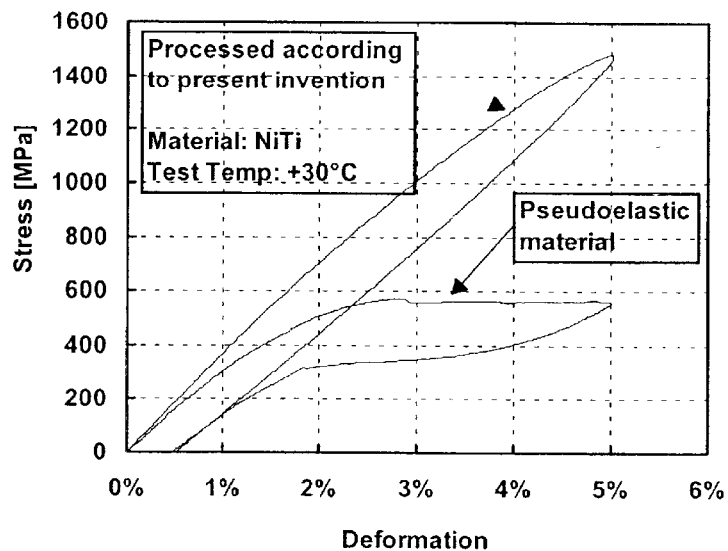

Figure 4(a): Increasing of the permanent strain at the end of the stress-strain test on increasing the maximum imposed strain for a specimen treated according to present invention Figure 4(b): Comparison between a NiTi wire processed according to present invention and a standard pseudoelastic NiTi alloy.

Calorimetric curve of a specimen taken from a temple produced according to present invention Calorimetric curve of a specimen submitted to a complete anneal treatment (900°C for 1h in vacuum) in order to remove all the effects of the invented process.

Summary of the stress-strain curves tested at different temperature on temples produced according to present invention.

EYEGLASSES AND PARTS THEREOF MADE WITH SPECIALLY PROCESSED NITI SHAPE MEMORY ALLOY

The present application is a continuation-in-part of Ser. No. 09/743,345, filed Jan. 9, 2001 which was the national stage filing of and claims priority to International Application No. PCT/IT99/00038, filed Feb. 19, 1999 and Italian Application Ser. No. MI98A001665, filed Jul. 20, 1998.

AIM OF THE INVENTION

The present invention is related to the production of eyeglasses temples. In more detail it relates to the production of eyeglass frames and part of them made of specially processed NiTi shape memory alloys. These frames have a high degree of elasticity and they can be used in a broad range of temperatures, in particular in the range of from −40° C. to 50° C. which is the typical range of use of eyeglass frames. At the same time they maintain the possibility to be plastically deformed in order to be adapted to the unique morphologies of the wearer's face.

BACKGROUND OF THE INVENTION

The Need for Elastic Materials in Eyeglass Frames

Alloys used in current eyeglass frames production are generally stainless steel, copper based alloys or nickel-copper and nickel-silver due to their easy formability and processing. A recognized limit of these alloys is, on the other hand, their poor elasticity. During normal use they can be easily bent in a permanent way causing distortion of the geometry of the frame. These permanent deformations bring also to a general discomfort for the wearer as the weight distribution on the face is not even and the correct distance between lenses and eyes is lost.

According to previous considerations a lot of attention has been drawn to the development of eyeglass frames with higher elasticity. The idea to use shape memory materials to solve above reported difficulties has been suggested in many articles and patents. Shape memory alloys have the unique property to withstand large deformation without permanent (plastic) deformation. As a figure of merit it can be stated that the maximum deformation sustainable by a shape memory metal, when compared with traditional metal, is about ten times larger. This figure of merit changes with materials and their thermo-mechanical processing but it well justifies the interest for these materials. The first application for the use of shape memory alloy in eyeglass frames dates back to 1979. Since than many applications and patents have been presented. The reason for this long list of application has to be searched in the complex nature of the mechanism underlying the shape memory effect and the pseudoelastic properties of shape memory alloys.

Shape Memory Alloys

Shape memory alloys are metallic materials in which a solid state transformation takes place. The transformation is called Thermoelastic Martensitic Transformation (TMT) and it is a thermodynamic first order transformation, solid-solid, that can be promoted by temperature changes or by application and removal of a stress field (than the name of thermoelastic). The TMT transforms a generally ordered crystallographic cubic structure (usually referred as Austenite) to a lower symmetry crystallographic structure usually referred as Martensite. It is quite difficult to explain in detail the mechanism underlying the capability of shape memory alloy to restore their initial shape but, for our purposes, it can be simply sketched according to FIG. 1. When in a shape memory metal the thermoelastic martensite forms the crystallographic arrangement of the atoms change from the cubic ordered structure to a complex shape with many internal interfaces (usually referred as twins—FIG. 1(b)) that has the unique property to arrange very easily. Once a deformation is imposed to the martensite these interfaces tend to expand and to accommodate in order to minimize the deformation at the microscopic level (FIG. 1(c)). A macroscopic shape change takes place without causing permanent damage of the internal structure. Hence, from the point of view of the material, at the microscopic level nothing changes and once the metal is heated up again to the austenitic phase it is able to reconstruct quite easily the original macroscopic shape (FIG. 1(d)). The example describes what is generally called "one way shape memory effect".

We mentioned before that temperature or stress might equally activate TMT. If a shape memory metal is submitted to an external stress (e.g. it is pulled), in a proper temperature range, martensite starts to form. The deformation mechanism is completely equivalent to the one described before so that once the stress state is removed the shape memory metal will recover its initial shape. It is clear that this case exemplifies the "pseudoelastic effect".

Figure 2:
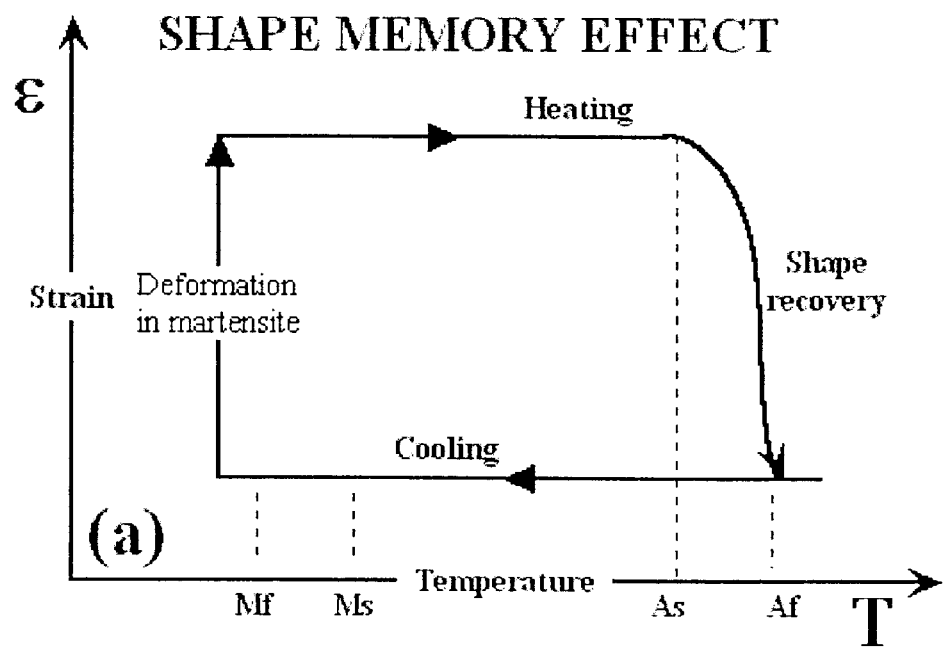
Figure 2:
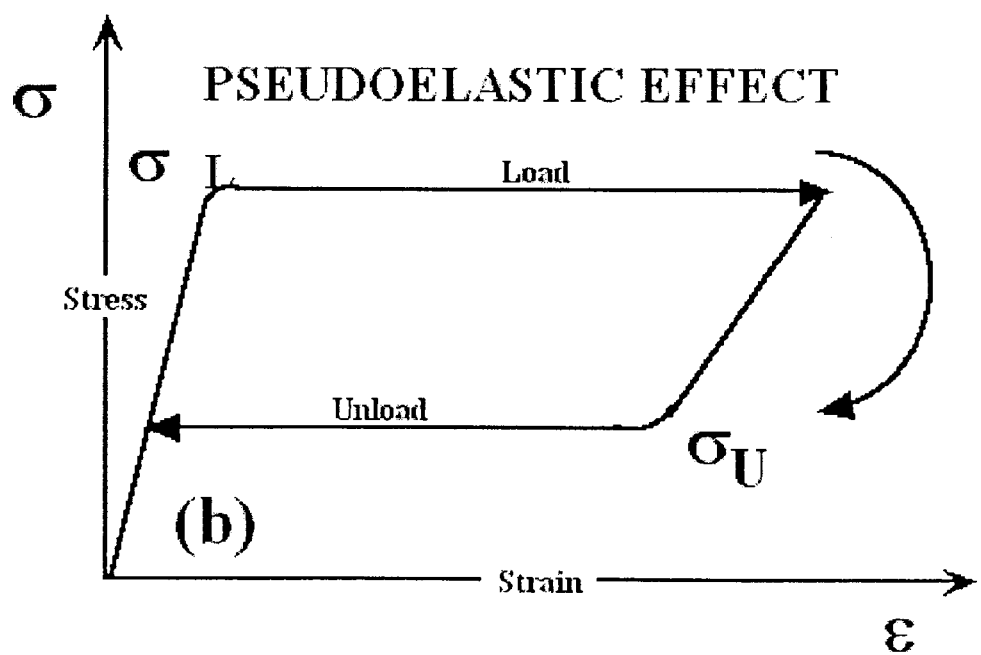

By energetic consideration and due to microstructural mechanisms active during TMT both the transformations induced by temperature or the one induced by stress exhibit hysteresis. FIG. 2 compare two examples of a complete thermodynamic cycle in the strain-temperature ($\epsilon$, T) plane (FIG. 2a) and in the stress-strain ($\sigma$, $\epsilon$) plane (FIG. 2b). They are the experimental evidence of a transformation cycle induced by temperature (T) and of a transformation cycle induced by stress ($\sigma$). The two graphs exemplify the shape memory effect and the pseudoelastic effect. In FIG. 2(a) a shape memory metal is cooled causing the TMT. The transformation from austenite to martensite takes place between Ms (martensite start temperature) and Mf (martensite finish temperature). No deformation takes place spontaneously but the material, in the martensite phase, is able to withstand large deformations without microstructural damages. Strain is applied in the martensitic phase causing apparent permanent deformation to set in. By heating the sample, the transformation from martensite to austenite takes place between As (austenite start temperature) and Af (austenite finish temperature). On entering this temperature range the sample starts to recover the initial shape.

In FIG. 2(b) a shape memory metal is pulled at a constant temperature. This temperature must be in the range Af, Md where Af is the previously defined Austenite finish temperature whilst Md is the maximum temperature at which martensite can be induced by an applied stress. As a rule of thumb the temperature range [Af,Md] is generally 10 to 50° C. wide according to alloy selection and material processing. On increasing stress level (that is somehow equivalent to decreasing temperature in previous case) martensite start forming in the sample. The TMT taking place is proved by the constant stress deformation taking place at $\sigma L$ (loading stress). At the end of the plateau all the material is transformed to the martensitic phase that is stable only at that specific stress level. Removing stress (unloading) the TMT takes place from martensite to austenite at a lower stress level $\sigma U$ (unloading stress).

Both the shape memory effect and the pseudoelastic effect have been proposed to be used in the production of eyeglass frames. In the first case the frame will behave in the following way. Should the temple be accidentally bent, heating it in the temperature range where austenite is stable can restore its original shape. In the second case the frame will behave like an elastic frame. If bent the shape memory metal will accommodate the deformation by forming martensite and, at the very moment the force causing deformation is removed, it will recovery the original shape.

For thermodynamic arguments the temperature range in which the shape memory metal is able to exhibit the pseudoelastic property is quite narrow and it is generally accepted that it is too narrow to be useful for the production of frames. Patents have been proposed to overcome this limitation.

Superelasticity and Pseudoelasticity

In the above description we have named the shape recovery in the case of the TMT activated by stress as "pseudoelasticity". It is however easy to demonstrate that many times in literature this term is used interchangeably with the term "superelasticity" in order to emphasize the exceptional elasticity degree of these materials. The term "pseudoelasticity" should be considered the more precise from a scientific point of view as it points out that the mechanism underlying the macroscopic elastic behavior is not the standard elastic mechanism (Hook's law). It is a different mechanism related to the presence of the TMT and as a consequence the macroscopic evidence is correctly referred as "pseudo-elasticity", i.e. not the proper usual elasticity.

A further point needs to be clarified in order to fully understand the present invention. It is known to prior art (G. R. Zadno, T. W. Duerig in *"Engineering Aspects of Shape Memory Alloys"—Butterworth-Heinemann*, 414–419,1990) that by cold drawing a NiTi alloy it is possible to obtain enhanced elastic properties without any evidence of the martensitic transformation. In this case the stress strain property will be similar to the one reported in FIG. 3(*a*). No evidence is present of the pseudoelastic constant stress plateau and the deformation takes place in a roughly linear way. Furthermore this behavior is only slightly temperature dependent and it is not related to the degree of cold work. In this case the effect is referred to as superelasticity or linear superelasticity. Nomenclature choice in this case appears more adequate. In this case the material behaves like enhanced elastic one and there is no evidence of the TMT.

DESCRIPTION OF THE INVENTION

The standard approach to enhance elastic properties of shape memory alloys and specifically of NiTi, is to apply to the material a proper combination of cold working and thermal treatment in order to increase the temperature range [Af, Md]. This is obtained by increasing the hardness of the austenitic phase allowing it to resist higher stress level prior of the activation of permanent deformation mechanisms. Processing of shape memory alloys from this point of view is a non-trivial task and many patents and articles suggest different approach to control pseudoelastic properties.

A patent by Zidner et al. (EP 0310628) teaches to optimize the desired properties on a quite large temperature range that is [−20; +40° C.] indicated as optimal for the specific application. In this case it is suggested to use a combination of pseudoelastic and superelastic properties. By carefully processing shape memory alloys with an intrinsic pseudoelastic temperature range roughly between 10° C. and 40° C. it is possible to introduce a low level of superelasticity in the lower temperature range (say [−20° C.; 10° C.]). Changing temperature will than change the mechanism underlying the shape recovery with a general macroscopic behavior that brings to elastic eyeglass frames. Should the frame be submitted to apparent permanent deformation in the lower temperature range it could be readily recovered by heating. In fact the transformation properties of the alloy were not removed by prior. processing and allow normal shape recovery. This is proved by the presence in the mechanical curves of the alloys processed according to the patent of a clear pseudoelastic plateau.

Processing shape memory alloys according to previous patent is obviously quite complex, as the aim is to reach a precise combination of pseudoelasticity and superelasticity. It is clear to the skilled person that producing an eyeglass frame involves several plastic deformation steps in order to reach the final shape. This causes the application of prior art to be quite impractical and difficult to control. In fact, as an example, each processing step should be considered at the light of the final work hardening that it will induce in the element of the frame.

Present invention aims to provide a shape memory alloy and processing which reduces the complexity of producing components for eyeglasses frames by using only superelasticity.

The treatment of the alloy selection provided by the present invention is a modification of the common used ones. It recognizes that metal forming procedures have differences in the final properties of the NiTi wires and optimizes them in light of the use of NiTi elements in production of eyeglass frames. Prior studies have not provided detailed information on the way of imparting superelasticity to NiTi shape memory alloys. It was simply recognized that cold drawn NiTi wires exhibits a substantial elasticity increase.

On the other hand it is well known to SMA practitioners that intermetallic NiTi suffers of severe work hardening and it is generally difficult to overcome a maximum limit of about 45–50%. Should this limit be overcome it is likely that the material will break.

As a consequence it is clear that the processing of the metal should be done taking care to avoid overcoming the maximum workability of the alloy. At the same time it has to ensure a total amount of cold working that is able to completely remove the transformational properties of the alloy.

The use of the material subjected to the forming procedure described in this invention allows obtaining a material with superelastic properties that can be considered ideal for an economical production of eyeglass frames. In addition these frames will have other characteristic features like wearer comfort, post production formability, sufficient stiffness and resistance to accidental bending.

A typical process to obtain the material subject of the present invention implies to start with a conventionally cold drawn NiTi wire with an average cold working not less than about 30%. This material has an odd distribution of the degree of cold working from surface to central part due to the inherent non-homogeneity of the drawing process. The inner core of the wire will be characterized by a slightly lower degree of cold working.

It is worthwhile to note that the level of cold working is usually estimated as the percentage reduction of area of the specimen. So it represents only an average estimation of the real modifications induced in the material.

The wire is than submitted to a deformation process able to redistribute in a more even way the cold working by a proper mechanical processing i.e. by causing the material to be heavily and repeatedly deformed with only slight modification of the cross sectional area. A preferred way will consist in bending the wire close to the. breaking limit and releasing it and repeating this operation several times each time twisting the wire along the main axis.

It has been recognized that an alternate way to reach the same result is to slightly increase the total cold working level by means of rotary swaging in order to increase the total deformation up to 35–40%. Another equivalent although slightly less effective is to cold roll the round wire to a square section of the same area.

The reason for this equivalence has not been detailed out yet due to the difficulties in performing a complete evaluation of the connection between microstructural deformations and macroscopic properties in NiTi. In any case it is believed that the specific texture developed during the drawing process may be affected by subsequent reduction by hammering or rolling increasing the elasticity and ductility properties of the wires.

Figure 3:
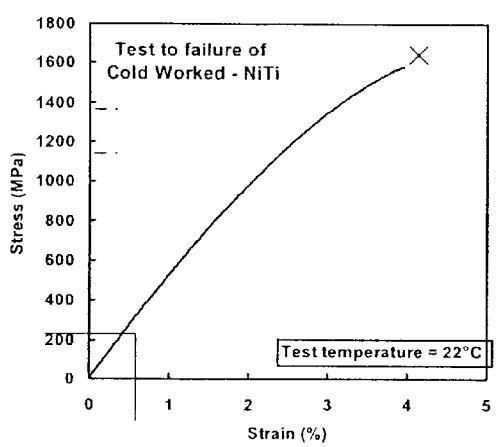
Figure 3:
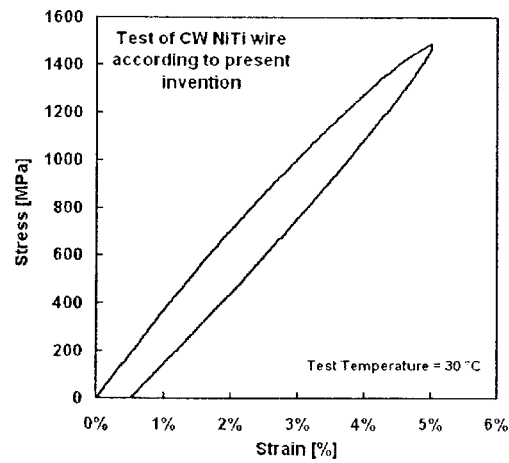
Figure 3:
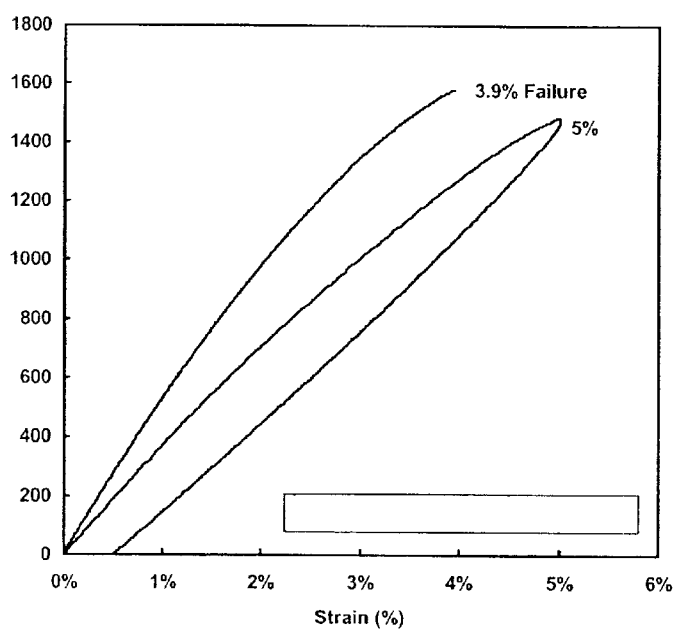

At the end of the invented process the wire has a more even distribution of the cold working degree. The effect of this process is to obtain a metal that maintains a high degree of cold working and at the same time has a lower elastic modulus and an increase of the elongation to failure. FIG. 3 compares the mechanical properties of a cold drawn NiTi wire and of a NiTi wire processed according to present invention. Curves reported have to be considered as the average of different specimens. The Young modulus of the material changes from about 50–55 GPa to about 35–40 GPa and the alloy can easily reach 5% of deformation.

It is evident appear from FIG. 3 that the elastic recovery of the wire pulled up to 5% is not complete. Performing subsequent stress-strain tests increasing the maximum strain a result as reported in FIG. 4 can be obtained. It is apparent that the present invention allows to obtain about 2–2.5% of perfect elastic recovery but also with a maximum strain of 5% the permanent strain is lower than 0.8%.

FIG. 4(b) compares the stress strain curve of a NiTi wire processed according to present invention and a standard pseudoelastic NiTi alloy. It is apparent that in spite of the decrease of Young Modulus the superelastic NiTi has in any case a higher stiffness.

Furthermore in these conditions it is able to withstand further severe plastic deformations involved in the production of the eyeglass frames.

The functional properties of NiTi wires submitted to the invented procedure were tested and main results will be briefly discussed.

Figure 5:
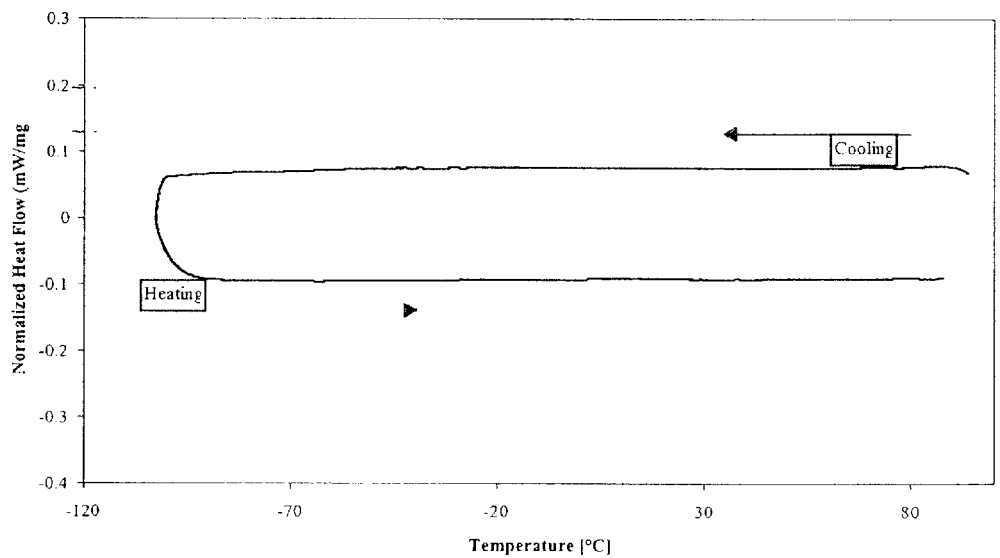
Figure 5:
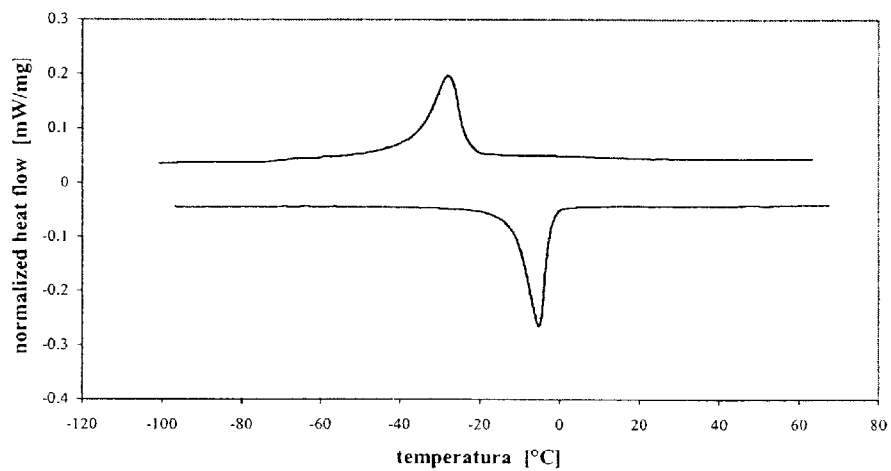

First of all it was tested that no TMT is present. This is a key point in order to avoid temperature dependence of the mechanical properties i.e. in order to avoid any pseudoelastic property. According to standard characterization of shape memory alloys this was performed by mean of differential scanning calorimetry (DSC). By means of this technique it is possible to measure the heat exchanged by a specimen with the surroundings during a complete thermal cycle. FIG. 5 is the calorimetric curve of a specimen taken by a NiTi wire processed according to present invention. It is evident that no martensitic transformation is present, as both in the cooling and heating branches of the curve no transformation peak is present. For comparison the calorimetric curve of a fully annealed specimen taken from the same material is reported. In this case, as expected, there is clear evidence of the transformation peaks and the Ms, Mf and As, Af temperatures can be easily detected.

Figure 6:
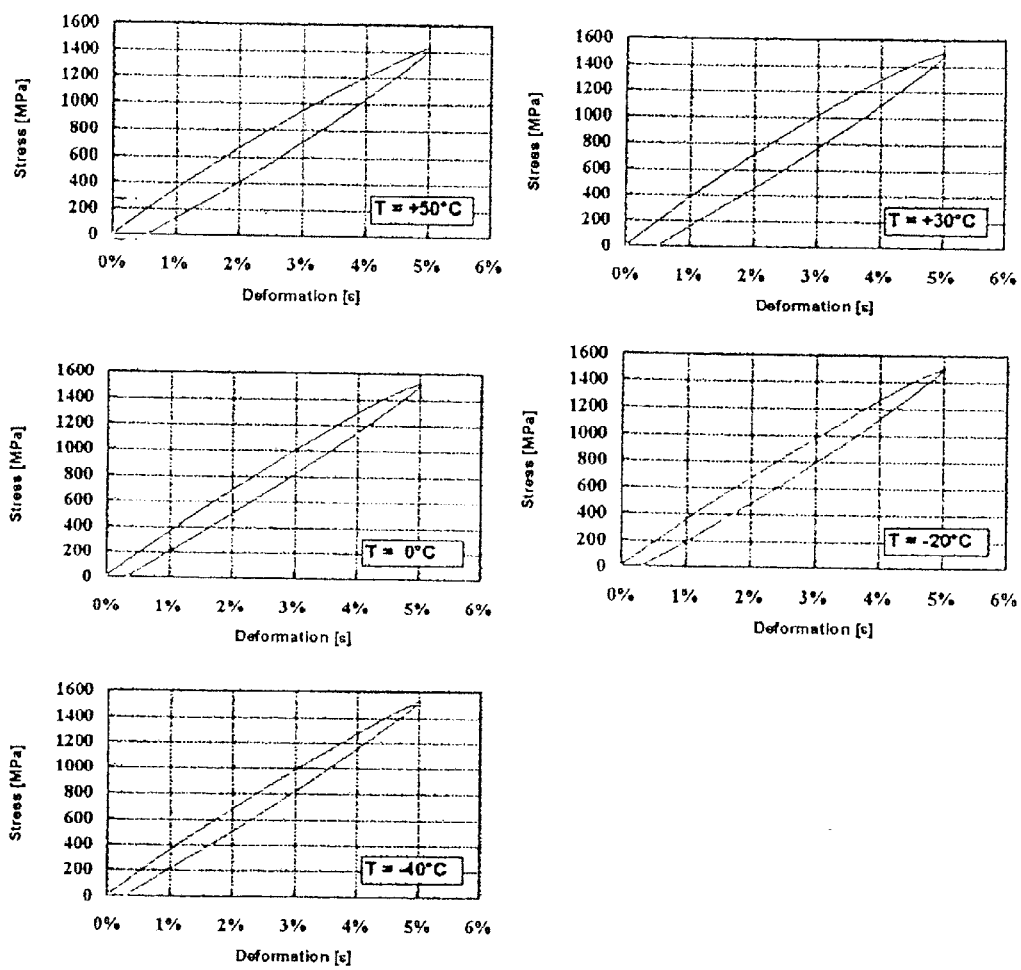

Subsequently straight specimens of the NiTi wires treated according to present invention have been pulled in tensile mode in an electromechanical testing machine equipped with a thermal chamber in order to test mechanical properties at different temperatures. Tests were performed at −40° C., −20° C., 0° C., 30° C. and 50° C. FIG. 6 summarizes the results obtained. The superelastic behavior of the NiTi wire is clearly evident at all the tested temperatures. No evidence is present of pseudoelastic constant plateau and in any case recovery of the initial shape is almost complete.

This eventually proves that the proposed invention fulfilled its basic requirements. A process has been pointed out that allows for the production of economical eyeglass temples in quite a simple manner. It consists in rearranging the structure of microstructural defects induced in the material by means of conventional cold working. By this process it is possible to obtain an increase of the elongation to failure value of the NiTi wires and lowering of the Young modulus. This is useful in the production of eyeglass frames.

It has been observed that these frames have other characteristic features like wearer comfort, post production formability, sufficient stiffness and resistance to accidental bending. Wearer comfort is increased as increased stiffness (see FIG. 4(b)) when compared to standard pseudoelastic material allows to produce thinner and hence lighter frames. Post production formability is guaranteed has, if needed, the temple can be gently bend in order to overcome the superelastic limit and to store further plastic deformation. In this way the frame can be adapted as normal eyeglass frames and once modified it will still maintain its previous elastic properties.

It has been observed that similar processing can be applied to ternary modifications of NiTi such as NiTiX with X=Cu, Fe, Nb. It is expected that comparable results could be obtained in the case that X=V, Mo, Co, Ta, Cr, and Mn.

Figure 7:
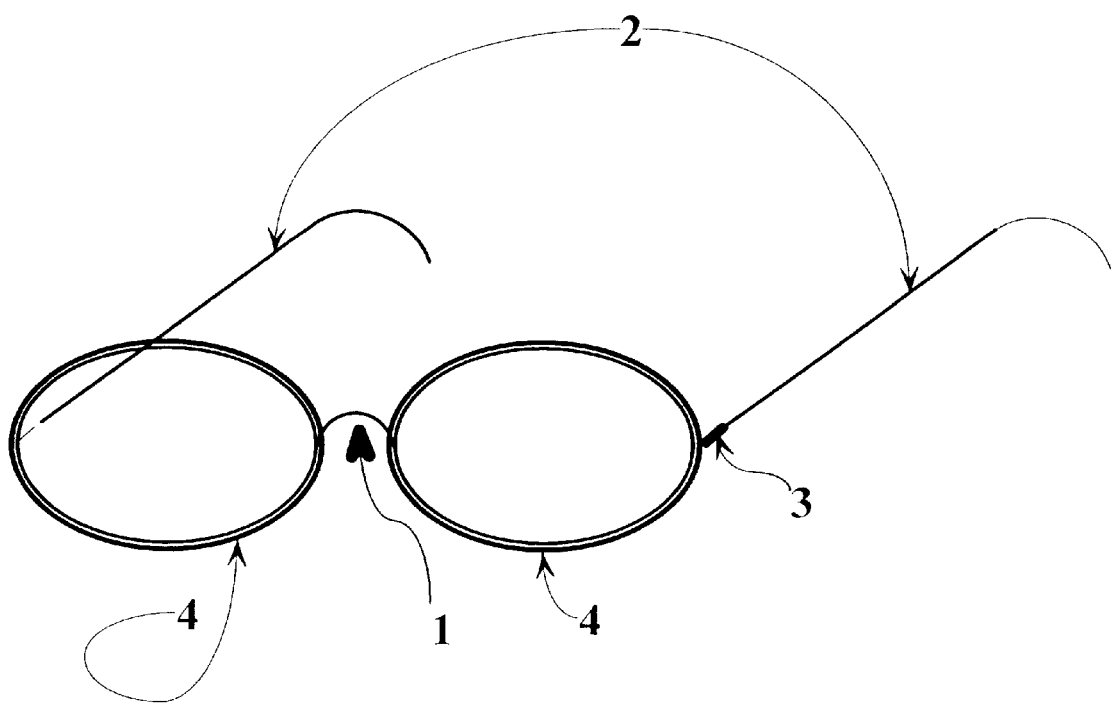

FIG. 7 shows eyeglass frame parts that can be made using the material provided by present invention. The eyeglass frame includes the lens frames 4, the bridge 1, the hinges 3 and the earpieces 2. The above disclosed invention suggests processing protocols to prepare parts of the eyeglass frame such as the earpieces or the nose pieces. A typical schedule is provided below. After drawing the wire to the required diameter having care to stop with a total cold working of about 30% the wire is forced to bend several times in different directions by passing it through a special machine. Once the wire is perfectly straight it can be cold shaped to the final form, for example, forcing it in a die. Specimen taken from the processed wire and tested by DSC must not exhibit any transformation peak. Tensile stress strain measurement of the processed wire or component must not manifest temperature dependence of the mechanical properties and no pseudoelastic plateau must be present.

It will now be apparent to a person skilled in the art that other embodiments, improvements, details and uses can be made consistent with the spirit of this disclosure.

The scope of this patent is limited only by the following claims, construed in accordance with the patent law, including the doctrine of equivalents.

What is claimed is:

1. Eyeglass frame having one or more components, or portions thereof fabricated from a superelastic wire made from an NiTi based memory shape alloy having more than 2% elasticity over a temperature range of −40° C. to 50° C., said superelastic wire being made by conventional cold drawing of NiTi wire with an average cold working of about 30% which forms a worked wire and then subjecting said worked wire to a process which consists essentially of deforming by mechanical processing to increase the total cold working up to 35 to 40%.

2. Eyeglass frames as defined in claim 1 wherein the mechanical deformation is carried out by bending the wire with an average cold working of about 30%.

3. Eyeglass frames as defined in claim 1 wherein the mechanical deformation is carried out by rotary swaging or hammering or by bending the wire with an average cold working of about 30% around a mandrel.

4. Eyeglass frames as defined in claim 1 wherein the Ti content in the alloy ranges from 48 to 51%.

5. Eyeglass frames as defined in claim 1 wherein the NiTi based shaped alloy is a ternary modification of NiTi, as NiTiX with X being equal to Cu, Fe, Nb, V, Mo, Co, Ta, Cr and Mn.

6. Eyeglass frames defined in claim 1 wherein X is equal to Cu, Fe, and Nb.

7. Eyeglass frames as defined in claim 1 wherein X ranges from 1 to 25%.

8. Eyeglass frames as defined in claim 1 wherein said components include a bridge, a pair of temples, lens frames and earpieces.

9. Eyeglass frames as defined in claim 1 wherein the Youngs modulus of the superelastic wire is about 35–40 GPa.

10. Eyeglass frames as defined in claim 9 wherein the superelastic wire can reach 5% of deformation.

* * * * *